United States Patent [19]

Cretin et al.

[11] Patent Number: 5,481,502

[45] Date of Patent: Jan. 2, 1996

[54] SYSTEM OF ACQUISTION AND CENTRALIZATION OF DATA OBTAINED THROUGH A PERMANENT PLANT FOR EXPLORING A GEOLOGIC FORMATION

[75] Inventors: Jacques Cretin, Le Chesnay; Jean-François Therond, Neuilly s/Seine; Jean Laurent, Orgeval, all of France

[73] Assignee: Institut Francais de Petrole, Rueil Malmaison, France

[21] Appl. No.: 40,453

[22] Filed: Apr. 1, 1993

[30] Foreign Application Priority Data

Apr. 1, 1992 [FR] France ................................. 92 04052

[51] Int. Cl.$^6$ .............................................. G01V 1/40
[52] U.S. Cl. ........................... 367/77; 367/15; 364/421; 340/853.1
[58] Field of Search .................... 367/15, 25, 76, 367/77, 78, 79; 340/853.1, 853.3, 853.9, 825.06, 825.07; 364/421

[56] References Cited

U.S. PATENT DOCUMENTS

| | | |
|---|---|---|
| 3,987,405 | 10/1976 | Laurent . |
| 3,996,553 | 10/1976 | Laurent . |
| 4,493,063 | 1/1985 | Tims et al. ................................. 367/77 |
| 4,725,992 | 2/1988 | McNatt et al. ........................... 364/421 |
| 4,815,044 | 3/1989 | Deconinck et al. ...................... 367/77 |
| 4,885,724 | 12/1989 | Read et al. ............................... 364/421 |
| 4,978,152 | 12/1990 | Rialer et al. ............................... 367/76 |
| 5,124,909 | 6/1992 | Blahely et al. .......................... 395/200 |
| 5,206,835 | 4/1993 | Beauducel ................................. 367/79 |

FOREIGN PATENT DOCUMENTS 0275781 7/1988 European Pat. Off. ................. 367/77

OTHER PUBLICATIONS

Miller, J. W., National Telecommunications Conference, Dallas, Tex., Dec. 1976, pp. 46.1-1 to 46.1-5.
Gus–Bus, published Sep. 1977, 19 pages, Catalog.
Webster et al., IEEE Transactions on Geoscience and Remote Sensing, vol. GE–19, #2, Apr. 1981, pp. 91–94.
NEC Research and Development, No. 59, Oct. 1980, pp. 20–26, Miyamoto et al.
Patent Abstracts of Japan, vol. 8, No. 226, Oct. 17, 1984.

*Primary Examiner*—Nelson Moskowitz
*Attorney, Agent, or Firm*—Antonelli, Terry, Stout & Kraus

[57] ABSTRACT

The invention centralizes data acquired through active or passive monitoring equipments installed permanently in contact with a geologic formation and notably in wells, under the control of one or several permanent stations (PCL) comprising microcomputers. The signals collected by these stations including spontaneous or induced seismic signals, parameters measured by condition sensors, etc., are converted and transferred onto a communication network managed by a server. The signals are translated into a common format more easily accessible for a seismic laboratory taking part in the processing of the data collected by the various monitoring equipments.

15 Claims, 3 Drawing Sheets

SYSTEM OF ACQUISTION AND CENTRALIZATION OF DATA OBTAINED THROUGH A PERMANENT PLANT FOR EXPLORING A GEOLOGIC FORMATION

BACKGROUND OF THE INVENTION

The invention relates to a system for acquisition and centralization of data obtained through the exploration of a geologic formation, which facilitates grouping in a central station, of data independently collected by a plurality of stations.

The system according to the invention may notably be applied to the geophysical exploration field for which the survey of reservoirs containing petroleum effluents requires the setting of complex systems for collecting signals of various kinds representative of the configuration of the formations monitored or of thermodynamic data obtained in situ, and notably data collection systems at least part of which are installed permanently.

DESCRIPTION OF THE PRIOR ART

French Patent Applications 91/15,691 and 92/03,575 filed by the Applicant now respectively French Patents 2,685,093 and 2,688,896 which correspond to U.S. patent application Ser. No. 991,594 describe a stationary system for the active and passive monitoring of subsurface reservoirs. Monitoring is achieved by installing various devices or user modules notably along one or several wells drilled through a formation, behind casings or in the annular space between such casings and tubings, and by connecting these devices to a surface station by means of a particular transmission set which is simple and reliable and comprises one or several conducting lines and/or optical fibers. The devices or user modules are for example acoustic wave sensors such as geophones or hydrophones, condition sensors measuring various parameters such as pressures, temperatures, etc, or various tools requiring a power supply such as seismic sources, etc.

The surface station comprises a central control and recording set and units designed for a set communication procedure or protocol. It is thus capable of issuing its commands according to the device to be controlled and, in return, receiving all the signals transmitted whether they are analog or digital, and changing to several transmission channel assignment modes.

With such a monitoring system, long-duration monitoring operations may be performed on a large scale under satisfactory economic conditions.

A single surface station may control the monitoring of several different plants and possibly in several wells. In this case, linking cables enabling all the plants to be connected to this common central surface station may be installed. However, it should be noted that, if there is a great number of plants and/or if these plants are of very different types, the central station controlling the monitoring of the array of plants is very complicated and loses all of its adaptation or development capacity.

It is also conceivable that several acquisition systems controlled independently by several autonomous stations have to be used to achieve reservoir monitoring and exploration operations. In this case, communication devices have to be designed and installed for managing transfers between each of the permanent stations, as well as a central unit for storing and possibly processing all the acquired data. This is the case, for example, if one or Several permanent well monitoring equipments such as defined in the patent applications cited above are available and if all the data are to be transmitted to a central station or laboratory.

Difficulties increase when the permanent stations of the monitoring system receive, from the respective equipments thereof, digital data sequenced according to particular communication procedures and group them together in primary files with assignment and organization modes that may also differ from one station to another.

These passive monitoring operations generally work in conjunction with active monitoring operations. To that effect, an array of seimic sensors coupled with the ground or possibly the sea bottom is arranged either at the surface or slightly buried, and a mobile acquisition laboratory is positioned on the spot to control seismic emission-reception cycles with triggering of a seismic source, real-time central collection of the signals received by the array of sensors at the surface and processing of these signals.

It is advisable, in this case, that the mobile laboratory may also centrally collect and process all or part of the files received from the permanent stations, so as to be able to achieve comparisons or combinations.

If all the permanent stations worked according to a set communication procedure common to all the monitoring units installed on a site, the files would be made accessible, through coding the files with this common communication procedure. But, more commonly, data coming from several permanent stations working according to different communication procedure have to be transferred and transferring is more difficult to achieve.

One solution for allowing different control and acquisition stations to work together might consist, knowing the type of mobile laboratory available on the site, and the working communication procedure thereof, in creating therein as many specialized sets as there are different communication procedures, each of them being capable of translating systematically, into the communication procedure of the mobile laboratory, the data collected according to one of the various working communication procedures of the stations. It is easy to realize that this solution would be complex and costly if there was a great number of communication procedures to be converted, and also that it would lack flexibility since an adapted translation set would have to be added to every new monitoring equipment.

SUMMARY OF THE INVENTION

The system for acquisition and centralization of data obtained through the exploration of a geologic formation according to the invention allows the problems related to the collection and processing of data acquired by autonomous local stations to be solved, notably when these problems are complicated because of certain incompatibilities which may exist between these local stations working according to different working communication procedures.

It comprises in combination:
  at least one local station for controlling information exchanges with a monitoring equipment installed in contact with the geologic formation; and
  a communication network with communication units for connecting each local station to this network.

The system may also comprises a common storage connected to the network for storing files coming from the local stations.

The system according to the invention is specifically suited for acquisition and central of data obtained through the exploration of a geologic formation, in a processing station having its own communication procedure for forming and managing data files from one or several local stations working according to at least one communication procedure, different from the communication procedure used by the processing station. It comprises:

- translation means for converting the data files coming from each local station into an intermediate format common to all the files and to all the local stations before any transfer through the network; and
- a communication module for connecting the processing station to the network.

According to one embodiment of the invention, the system further comprises a local station for coordinating the local stations and communicating therewith through the network.

The common storage may be located in the local coordination station or in a server set managing the assignment of storage modules to the various local stations served by the network.

According to an embodiment of the invention, the local stations comprise a micro-computer provided with a communication card designed for the network and also possibly a conversion module for translating the data files into the intermediate format.

The permanent equipment in contact with the geologic formation may comprise devices installed in wells and notably reception devices coupled with the formation surface.

The invention further relates to a method for implementing the system; comprising:

- continuously connecting each local station to the network;
- intermittently connecting a mobile laboratory to the network for enabling access to the files procedured by each local station;
- commanding, with the mobile laboratory, of series of active exploration cycles achieved by means of a seismic emission-reception device and recording, in the mobile laboratory, the signals received during the series of active exploration cycles performed; and
- centrally collecting with the mobile laboratory, by means of the network, at least part of the data collected through the monitoring equipment in connection with the active exploration cycles.

The method may also comprise storing files translated to the intermediate format into a storage, jointly processing of the data coming from the permanent equipment and coming from the emission-reception devices, and optionally

- translating, into a common intermediate format, the files produced by each local station before any transfer on the network; and
- coding, with the mobile laboratory the files translated into the intermediate standard.

Command and data transfers may be handled easily with the network installed between the local stations, the server set or the co-ordination station, the storage, and possibly a processing station. The use of micro-computers, which may be easily completed with communication cards suited to the network used and preferably software for translating all the files produced by the various local stations into a common format, greatly simplifies transfers and processing by equipment which are not normally compatible.

BRIEF DESCRIPTION OF THE DRAWINGS

Other features and advantages of the system according to the invention will be clear from reading the description hereafter of embodiments given by way of non limitative examples, with reference to the accompanying drawings in which.

DESCRIPTION OF THE PREFERRED EMBODIMENTS

Figure 1:
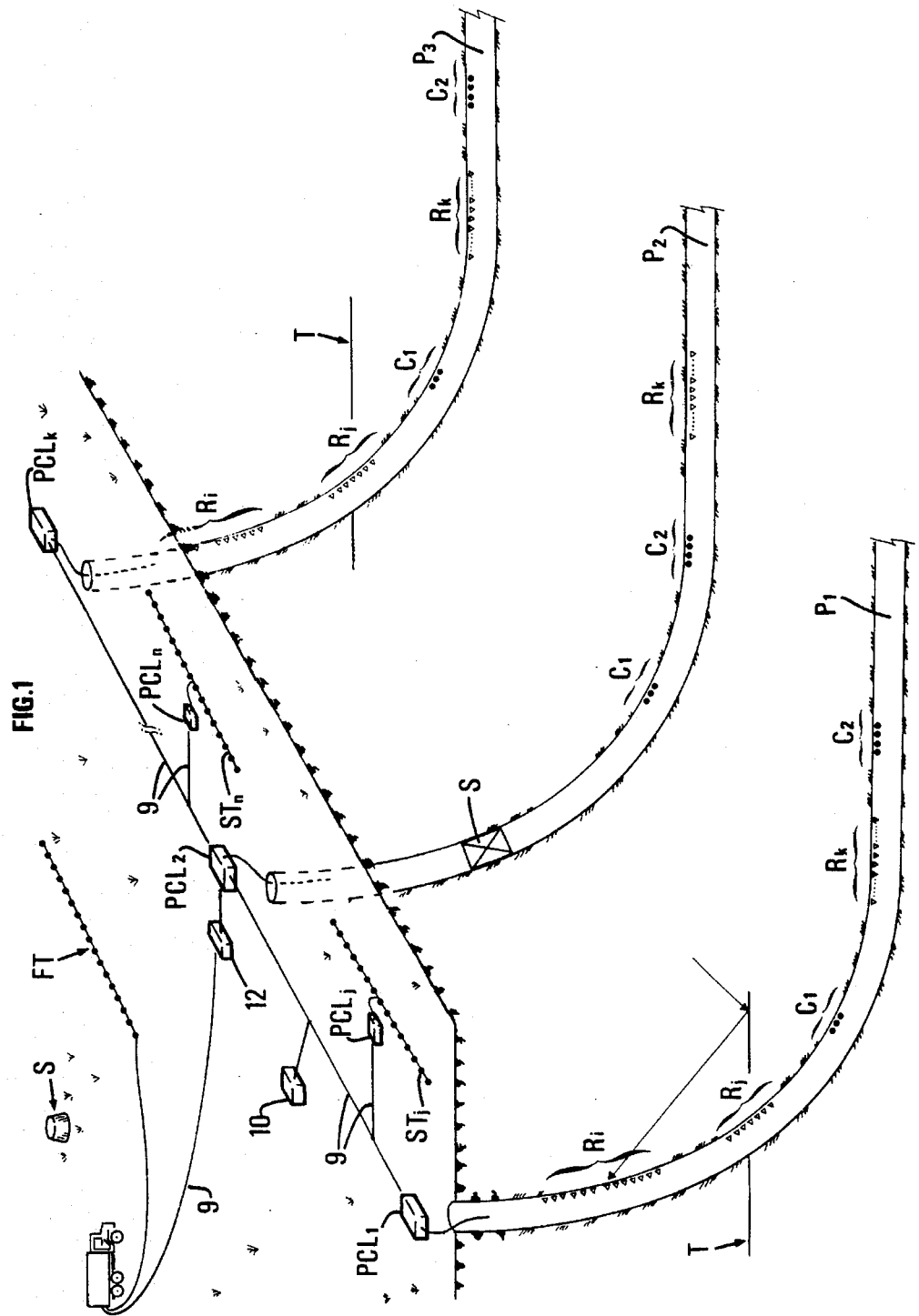
FIG. 1 shows an example of the system of acquisition and central processing of data obtained from several wells crossing a formation under monitoring or at the surface.

The system of acquisition and central processing of data relating to a geologic formation illustrated in FIG. 1 comprises for example several permanent stations PCL suited each for controlling the acquisition of various signals received by intervention devices such as monitoring equipments for example, installed permanently in contact with a formation containing for example petroleum effluents. These devices may be arranged in wells, as shown in FIG. 1, and as described in the two French patent applications cited above. A first array of receivers Ri such as three-axis geophones is arranged above the top T of a subsurface reservoir so as to pick up waves received after the triggering of a seismic source S in another well P2. One or several arrays Rk of geophones or hydrophones may be arranged in the part of the well crossing the reservoir so as to pick up for example the random seismic emissions induced by the production activity. Condition sensors C1, C2 may also be placed in the formation to measure the temperature, the pressure and other parameters characteristic of the geologic formation.

Figure 2:
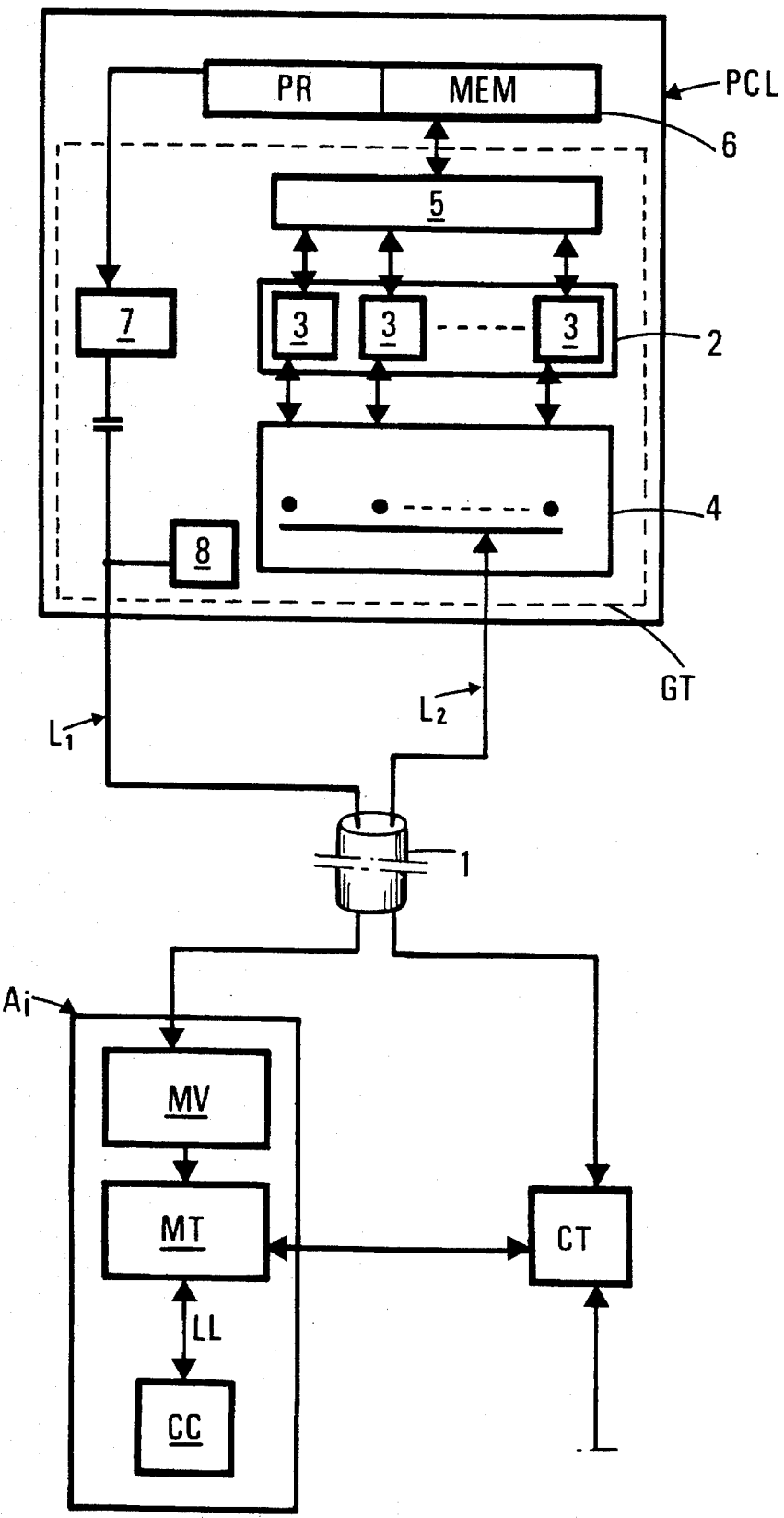
FIG. 2 is a block diagram of a local well monitoring set.

Each intervention device Ai comprises for example (FIG. 2) a monitoring module MV connected permanently to an acquisition set PCL at the surface and receiving therefrom, through a line L1 of a transmission cable 1 for example, power supply and possible commands concerning the associated intervention device Ai. It also comprises a user module MT connected through a local link LL to sensors CC picking up signals or thermodynamic parameters for example. Each user module is connected to a data transmission channel L2 of the same cable 1 (line or optical fiber) common to all the devices by means of a switching means CT. The functions of channels L1 and L2 may, in some cases, be fulfilled by a single-line cable.

The intervention devices in the wells, such as device Ai, are controlled by a permanent local station PCL and connected thereto by cable 1. Each local station PCL comprises for example a set GT for controlling the local telemetry allowing exchanges, through cable 1, with the intervention devices in the well, this set comprising a subset 2 consisting of one or several units 3 specialized each in the control of exchanges with a certain type of intervention device Ai, a selector 4 for connecting one of them to the line or optical fiber L2 of cable 1 and an acquisition unit 5.

The control set GT is connected to a central processor 6 of a well-known type comprising an arithmetic and logical unit PR and storage units MEM for programs and data. A coding element 7 allows application of addressing signals on line L1.

Power is supplied to the monitoring modules by a power supply unit 8 also connected to line L1. Each local station consists for example of a programmed micro-computer provided with a data acquisition card.

Figure 3:
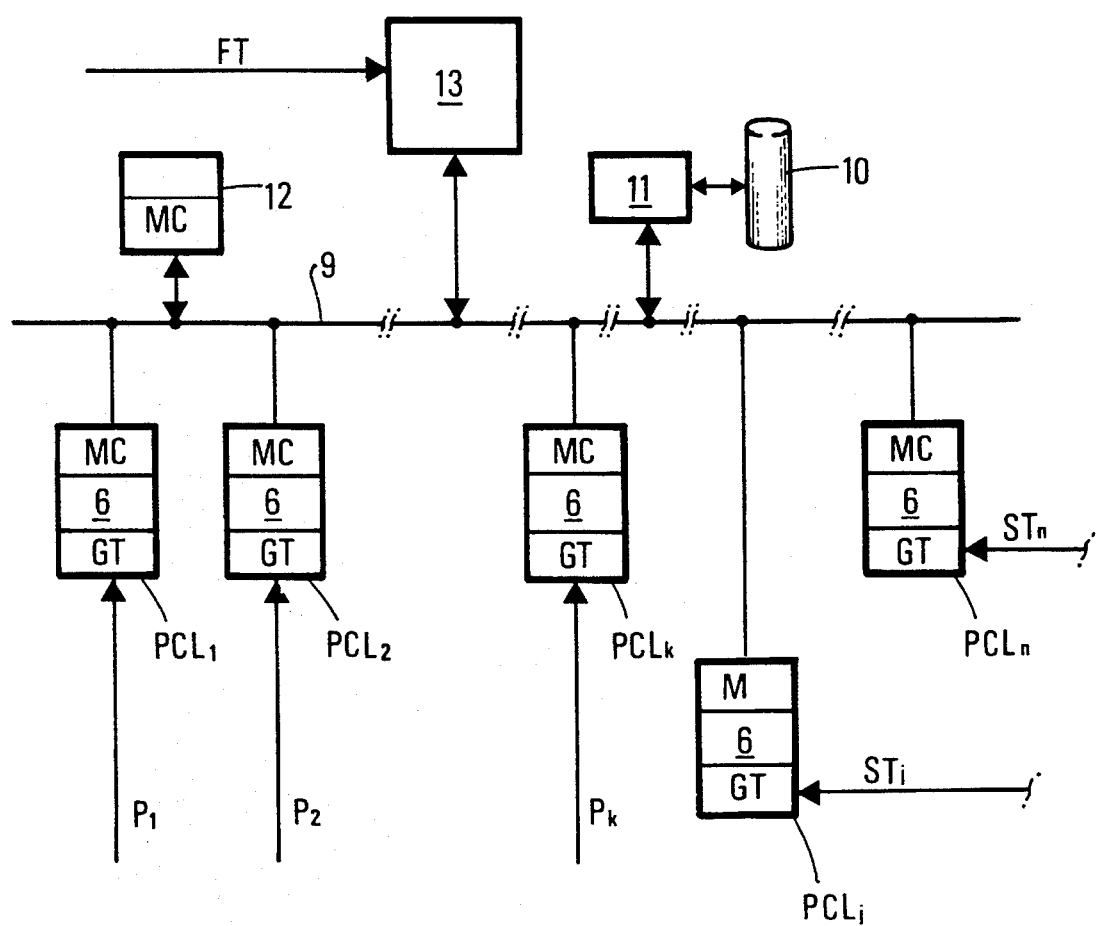
FIG. 3 is a block diagram of the acquisition and central processing system according to the invention.

The intervention devices may also consist of seismic signal reception sets STj, STn (FIG. 3) coupled with the ground surface or possibly with the ocean floor within the scope of offshore searches such as, for example, the profiled geophone holder described in patent FR-2,254,033 filed by the applicant. These sets may be in contact with the ground or the ocean floor, or buried at a slight depth beneath the surface. Each of these reception sets is also controlled by an analogous local station PCLj . . . PCLn suited for managing the acquisition of the signals picked up by each reception set.

Because of the great diversity of intervention devices Ai depending upon each local station PCL, management of the exchanges along the cable is most often prompted by particular specifications relating to the format of the digital words transmitted on lines L1, L2, or to the sampling frequency of the signals picked up in situ. This leads to generation of data files of different formats in each acquisition device or at least in some of them.

A first format consists for example of seismic signals in a demultiplexed format of 16 fixed bits sampled with a period of 1 ms for example; a second type contains for example 20-bit digitized words, 4 bits of which define the amplification gain, obtained with a different sampling frequency; a third type contains blocks of 24-bit numeric words for example, obtained by multiplexing of signals produced by three-axis geophones; a type relates to condition parameter measurements (temperatures, pressures, etc) in a format appropriate to the desired measuring accuracy, transmitted to the surface installation with a more or less long variable length periodicity within the scope of a long-duration monitoring process.

If the exploration system installed comprises several acquisition sets which are not compatible with each other as far as the format of the data and/or the sampling period is concerned, dispatching, at the end of the exploration sessions, all the data which may have been acquired to a locally available recording laboratory, which is likely to work according to a different communication procedure, is very complicated.

In order to simplify exchanges, the data acquisition and central processing system according to the invention comprises (FIG. 3) a link network 9 working according to a communication procedure of a well-known type such as Ethernet, Novell, Bit Bus or any other well-known industrial network, allowing the various local stations PCL to be united. Communication modules MC are added respectively to each local processor, preferably in the form of a specialized card suited for managing the transmission of data according to the mode peculiar to the communication network used.

According to one embodiment, the system comprises a storage means including one or several storage disks 10 for storing files which may be transmitted thereto by the various local stations PCL by means of network 9, and a control means suited for managing writing and reading on these disks.

The control of the memory space on these disks may be achieved for example by a server set 11. Upon each connection of a local station PCL to the network, the server set 11 assigns thereto a determined memory space on the disks of the storage means 10.

According to another embodiment, the permanent array of local stations PCL have a local coordination station 12 installed in the field or on a platform in case of an offshore application, and also consisting of a micro-computer provided with a communication module MC. The co-ordination station 12 is preferably equipped with a screen and a control keyboard, which enables at any time, in the absence of any seismic laboratory, the monitoring procedures in progress to be controlled and the data files stored in the storage means 10 to be looked up by an operator. It may also be programmed to command at any time the triggering of signal acquisition sessions by any user module MT, ST of the monitoring system installed in the field. In this case, the storage means 10 (the disks and the management means) are preferably included in this co-ordination station 12 which is then suited for managing the storage of the data coming from the local stations PCL and also for managing exchanges through network 9.

According to another embodiment, in case the data acquired are of different types, each local processor 6 is suited for converting the data into a format common to all data types, for example the SEGY standard, before transferring them into the corresponding files in storage means 10.

This conversion may be achieved by software modules by means of a specialized program included in the memory MEM of each local processor 6. The function of this program is also to associate with the data a label for defining the acquisition place (number of the well or of the array of receivers ST), the serial number in a series of successive acquisitions, etc.

The various translation software modules in the local stations are suited for converting the numeric words from their original local format into a common format, in the form, for example, of demultiplexed blocks of floating-point 32-bit numeric words, before transmitting them onto network 9 and storing them on disks 10.

This conversion into a common format is particularly advantageous when all the data stored on the disks of the server set 11, or possibly of the coordination station 12, are to be transmitted to a mobile station 13 (FIG. 3) such as a recording truck or a control and recording station on a seismic ship located at the site to perform seismic recording sessions and which most often works according to a communication procedure incompatible with those of the permanent equipment installed on the spot. Central storage and processing of the files on the storage means 10 associated with the local server 11 or, depending on the case, in the coordination station 12, may be achieved simply by adding to the processing set in the mobile laboratory:

a communication module MC suited to the network used, and a single conversion module such as a program in the memory MEM of each central processor 6 for example, allowing translation, from the particular standard data format into the common intermediate standard of the data in the disks of the storage means 10, as well as a program for operating the files generated in these disks. During connection with the mobile laboratory 13, the local coordination station 12 is deprived of the control of the various local stations PCL.

This single translation thus enables all the data collected by the monitoring system during a variable period to be centrally stored and processed by the central station.

The network 9 defined thereby allows a mobile laboratory 13 connecting thereto to collect and operate the data acquired from an array of autonomous local and often different stations, and the data it may receive from a seismic emission-reception system. It may then:

- control the triggering of a seismic source S (FIG. 1), and collect the signals received from an associated reception set FT;
- control the acquisition of the signals picked up by the monitoring equipment installed in the wells or in the field (sets ST) after the triggering of the source;
- read the files made up from these signals in the disks of the storage means 10; and
- display the files, transfer the files onto recording tapes, and correlate the files with each other, etc.

When the active seismic prospecting sessions are over, the mobile laboratory 13 may leave and let coordination station 12 again control the other local stations PCL.

The system which has been described is well suited to stationary equipments installed permanently in wells or in the field. It is however obvious that it may also be used for interconnecting a network of stationary monitoring equipments installed on a temporary basis such as, for example, arrays of geophones arranged at the surface or seismic sondes lowered into a well by means of a tubing, or possibly reception sets comprising several sondes which may be displaced along a well by means of an electric-carrying cable connected to surface operating means, etc.

We claim:

1. A system for centrally collecting data obtained during exploration of a geological formation comprising:

at least one local station provided with a set communication procedure to control exchange of information with a monitoring device coupled with the geological formation via a local transmission link;

a communication network provided with a set communication procedure different than the set communication procedure of the at least one local station;

a server set associated with a system memory for controlling communications with the at least one local station via the communication network; and an interface for transferring command and data signals between the at least one local station and the communication network.

2. A system for centrally collecting data obtained during exploration of a geological formation in a seismic signal processing laboratory having a set communication procedure for compiling and controlling data files comprising:

at least one local station provided with a set communication procedure to control exchange of information with a monitoring device coupled with the geological formation via a local transmission link and to compile data files according to at least one set communication procedure different than the set communication procedure of the seismic signal processing laboratory;

a communication network provided with a set communication procedure;

a server set associated with a system memory for controlling communications with the at least one local station through the communication network;

an interface for transferring command and data signals between the at least one local station and the standard communication network;

means for converting data files from the at least one local station into a data format common to all the files compiled in the at least one local station before any transfer of the data files to the communication network; and an interface communication module for connecting the seismic signal processing laboratory to the communication network.

3. A system according to claim 2 further comprising:

a plurality of local stations; and wherein the means for converting converts the data files from all of the local stations into the data format common to all the files before any transfer of the files to the communication network.

4. A system according to claim 3 further comprising:

at least one local coordinating station communicating with the local stations via the communication network and having means for controlling storage of data from the local stations in the system memory and exchange of data between the local stations via the communication network.

5. A system according to claim 3 wherein:

the memory includes memory modules allocated by the server set to the local stations via the communication network.

6. A system according to claim 4 wherein:

the memory is disposed at the at least one local coordinating station.

7. A system for centrally collecting data obtained during exploration of a geological formation in a seismic signal processor laboratory having a set communication procedure for compiling and controlling data files comprising:

a plurality of local stations with at least one of the local stations being permanently positioned in a wellbore for sensing signals from the geological formation via a local transmission link and each of the local stations including a microcomputer provided with a set communication procedure different than the set communication procedure of the seismic signal processing laboratory for controlling exchange of information with a monitoring device and compiling data files;

a communication network provided with a set communication procedure different than the set communication procedure of the seismic signal processing laboratory and the plurality of local stations;

a server set associated with a system memory for controlling communication with the local stations through the communication network;

an interface communication card in each of the microcomputers for transferring command and data signals between the local stations and the communication network; and an interface communication module for connecting the seismic signal processing laboratory to the communication network; and wherein each of the microcomputers converts data files from all of the local stations into a format common to all the files compiled in the at least local station before any transfer of the data files to the communication network.

8. A system according to claim 7 further comprising:

at least one local coordinating station communicating with the local stations via the communication network and having means for controlling storage of data from the local stations in the system memory and exchange of data from the local stations via the communication network.

9. A system according to one of claims 7 or 8 wherein:

the memory includes memory modules allocated by the server set to the local stations via the communication network.

10. A system according to claim 8 wherein:

the memory is disposed at the at least one local coordinating station.

11. A method for centrally collecting data obtained during exploration of a geological formation by a system comprising at least one local station provided with a set communication procedure to control exchange of information with monitoring equipment including sensors permanently coupled with the geological formation through a local transmission link, a communication network provided with a set communication procedure different than the set communication procedure of the at least one local station, a server set associated with a system memory for controlling communications with the at least one local station via the communication network, an interface for transferring command and data signals between the at least one local station and the communication network, and a seismic device including means for coupling seismic signals to the geological formation and sensors for sensing seismic signals emanating from the geological formation in response to the seismic signals comprising:

continuously connecting each local station to the communication network;

intermittently connecting a mobile laboratory to the communication network to allow access of the mobile laboratory to data collected at the at least one local station;

commanding with the mobile laboratory a series of active exploration cycles achieved by the seismic device and recording in the mobile laboratory sensed seismic signals sensed by the sensors of the seismic device during the series of cycles; and centrally collecting with the mobile laboratory via the communication network at least part of the data collected by the monitoring equipment during the active exploration cycles.

12. A method for centrally collecting in a seismic signal processing laboratory having a set communication procedure for compiling and controlling data files into a set format by a system comprising at least one local station provided with a set communication procedure to control exchanges of information with monitoring equipment including sensors permanently coupled with the geological formation through a local transmission link and to compile data files with a set communication procedure different than the set communication procedure of the seismic laboratory, a communication network provided with a set communication procedure; a server set associated with a system memory for controlling communications with the at least one local station through the communication network, an interface for transferring command and data signals between the at least one local station and the communication network, means for converting data files from the at least one local station into a format common to all the data files compiled by the at least one local station before any transfer of the data files to the communication network, and a seismic device including means for coupling seismic signals to the geological formation and sensors for sensing seismic signals emanating from the geological formation in response to the seismic signals comprising:

continuously connecting each local station to the standard communication network;

intermittently connecting the seismic signal processing laboratory to the communication network to allow access of the seismic signal processing laboratory to the data files produced by each local station;

commanding with the seismic signal processing laboratory a series of active exploration cycles achieved with a seismic emission-reception device and recording in the seismic signal processing laboratory signals sensed by the sensors of the seismic device during the series of cycles; and centrally collecting with the seismic signal processing laboratory via the communication network at least part of the data collected by the sensors of the monitoring equipment during the active exploration cycles.

13. A method according to claim 12 further comprising:

storing the data files converted to the format common to all the files in the system memory.

14. A method according to claim 12 or 13 further comprising:

jointly processing data produced by the monitoring equipment and the seismic device.

15. A method according to claim 12 or 13 further comprising:

translating the data collected by each local station into the format common to all data files before any transfer of the data collected by each local station via the communication network; and coding with the seismic signal processing laboratory the data translated into the format common to all data files into the set format of the seismic laboratory.

* * * * *